(12) United States Patent
Ota

(10) Patent No.: US 12,337,831 B2
(45) Date of Patent: Jun. 24, 2025

(54) DRIVING ASSISTANCE APPARATUS

(71) Applicant: SUBARU CORPORATION, Tokyo (JP)

(72) Inventor: Yui Ota, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 236 days.

(21) Appl. No.: 17/578,919

(22) Filed: Jan. 19, 2022

(65) Prior Publication Data

US 2022/0250614 A1    Aug. 11, 2022

(30) Foreign Application Priority Data

Feb. 10, 2021    (JP) .................................. 2021-019410

(51) Int. Cl.
  *B60W 30/00*    (2006.01)
  *B60W 30/09*    (2012.01)
  *B60W 30/18*    (2012.01)

(52) U.S. Cl.
  CPC ...... *B60W 30/09* (2013.01); *B60W 30/18163* (2013.01); *B60W 2554/4041* (2020.02); *B60W 2554/4042* (2020.02); *B60W 2720/10* (2013.01); *B60W 2720/106* (2013.01)

(58) Field of Classification Search
  CPC .......... B60W 30/09; B60W 30/18163; B60W 2554/4041; B60W 2554/4042; B60W 2720/10; B60W 2720/106
  USPC .......................................................... 701/26
  See application file for complete search history.

(56) References Cited

U.S. PATENT DOCUMENTS

| 2009/0265107 A1* | 10/2009 | Matsuno ................. G08G 1/166 701/301 |
| 2011/0288774 A1* | 11/2011 | Bengtsson ............. G08G 1/165 701/301 |
| 2015/0149037 A1* | 5/2015 | Lim ...................... B60W 10/20 701/41 |
| 2018/0186350 A1 | 7/2018 | Götz et al. |

(Continued)

FOREIGN PATENT DOCUMENTS

| CN | 112046472 A | * 12/2020 |
| JP | 2010-052546 A | 3/2010 |

(Continued)

OTHER PUBLICATIONS

Office Action dated Oct. 22, 2024, from corresponding Japanese Application No. 2021-019410, 9 pages.

*Primary Examiner* — Marc Burgess
*Assistant Examiner* — Michael T Dowling
(74) *Attorney, Agent, or Firm* — Rimon P.C.

(57) ABSTRACT

A driving assistance apparatus sets a driving condition of a vehicle, based on a risk of surrounding environment that includes an object around the vehicle. The driving assistance apparatus includes a forward-risk calculator, a backward-risk calculator, and a driving-condition setter. The forward-risk calculator is configured to calculate a forward risk corresponding to a risk of a collision with a leading vehicle that travels ahead of the vehicle. The backward-risk calculator is configured to calculate a backward risk corresponding to a risk of a collision with a trailing vehicle that travels behind the vehicle. The driving-condition setter is configured to set the driving condition of the vehicle, based on the forward risk and the backward risk.

7 Claims, 9 Drawing Sheets

(56) References Cited

U.S. PATENT DOCUMENTS

| | | | |
|---|---|---|---|
| 2019/0143968 A1* | 5/2019 | Song | B60W 10/18 |
| 2019/0308617 A1 | 10/2019 | Groult et al. | |
| 2020/0001839 A1* | 1/2020 | Lee | B60T 8/17558 |
| 2020/0324760 A1* | 10/2020 | Lee | B60W 30/18163 |
| 2021/0188260 A1* | 6/2021 | Jung | B60W 30/09 |
| 2022/0001865 A1* | 1/2022 | Park | B60W 60/0023 |

FOREIGN PATENT DOCUMENTS

| | | | | |
|---|---|---|---|---|
| JP | 2011143744 A | * | 7/2011 | H01L 24/97 |
| JP | 2018-526267 A | | 9/2018 | |
| JP | 2018-192954 A | | 12/2018 | |

* cited by examiner

DRIVING ASSISTANCE APPARATUS

CROSS-REFERENCE TO RELATED APPLICATIONS

The present application claims priority from Japanese Patent Application No. 2021-019410 filed on Feb. 10, 2021, the entire contents of which are hereby incorporated by reference.

BACKGROUND

The disclosure relates to a driving assistance apparatus that assists in driving a vehicle.

In recent years, a driving assistance apparatus that sets a travel trajectory along which a vehicle is to travel or a target vehicle speed and that assists in driving the vehicle has been increasingly used. An aspect of a known driving assistance apparatus is to set the travel trajectory along which a vehicle is to travel or the target vehicle speed, based on a risk of an accident or a collision between a vehicle and an obstacle.

Japanese Unexamined Patent Application Publication (JP-A) No. 2018-192954, for example, discloses that a driving assistance apparatus calculates basic potential that represents the degree of recommendation of a position at which a vehicle travels depending on the shape of a road, calculates manifest potential based on a manifest risk that is represented by information about an obstacle, forecasts a travel scene of the vehicle, forecasts a latent risk, calculates latent potential based on the forecasted latent risk, calculates a potential field by adding the basic potential, the manifest potential, and the latent potential, and sets the travel trajectory along which the vehicle is to travel, based on the potential field.

SUMMARY

An aspect of the disclosure provides a driving assistance apparatus configured to set a driving condition of a vehicle, based on a risk of surrounding environment that includes an object around the vehicle. The driving assistance apparatus includes a forward-risk calculator, a backward-risk calculator, and a driving-condition setter. The forward-risk calculator is configured to calculate a forward risk corresponding to a risk of a collision with a leading vehicle that travels ahead of the vehicle. The backward-risk calculator is configured to calculate a backward risk corresponding to a risk of a collision with a trailing vehicle that travels behind the vehicle. The driving-condition setter is configured to set the driving condition of the vehicle, based on the forward risk and the backward risk.

An aspect of the disclosure provides a driving assistance apparatus configured to set a driving condition of a vehicle, based on a risk of surrounding environment that includes an object around the vehicle. The driving assistance apparatus includes circuitry. The circuitry is configured to calculate a forward risk corresponding to a risk of a collision with a leading vehicle that travels ahead of the vehicle. The circuitry is configured to calculate a backward risk corresponding to a risk of a collision with a trailing vehicle that travels behind the vehicle. The circuitry is configured to set the driving condition of the vehicle, based on the forward risk and the backward risk.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

As for the driving assistance apparatus disclosed in JP-A No. 2018-192954, the forward risk of the vehicle is considered, and the backward risk of the vehicle is not considered. Accordingly, there is a possibility that neither a risk of a collision of the vehicle with a trailing vehicle nor a risk of exposure to dangerous driving cannot be dealt with.

It is desirable to provide a driving assistance apparatus that can assist in driving a vehicle in consideration for the backward risk of the vehicle in addition to the forward risk.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Overall Structure of Vehicle

Figure 1:
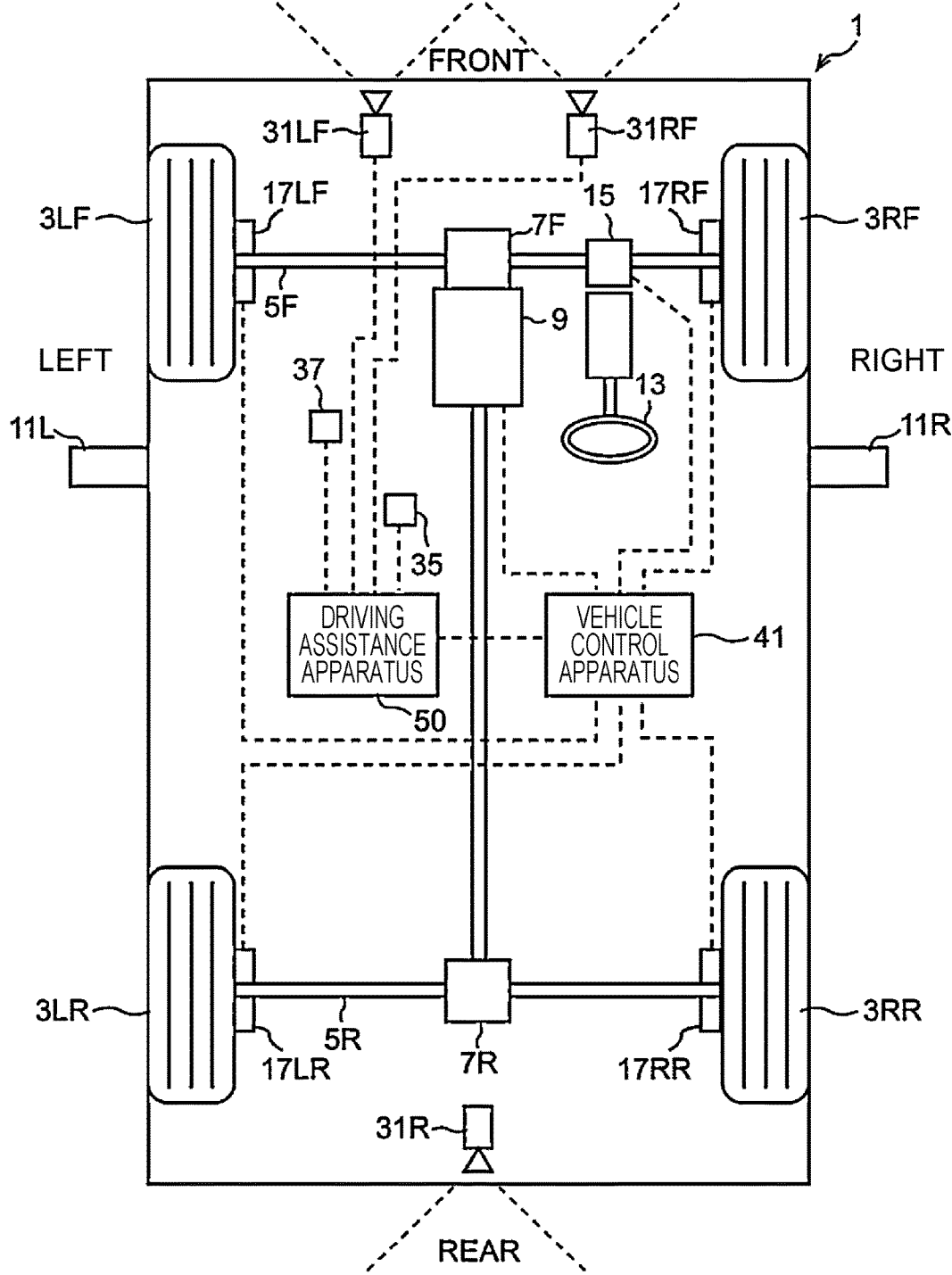
FIG. 1 schematically illustrates an example of the structure of a vehicle that includes a driving assistance apparatus according to an embodiment of the disclosure.

An example of the overall structure of a vehicle that includes a driving assistance apparatus according to an embodiment of the disclosure will be described. FIG. 1 schematically illustrates an example of the structure of a vehicle 1 that includes a driving assistance apparatus 50.

The vehicle 1 illustrated in FIG. 1 is a four-wheel drive automobile in which drive torque that is outputted from a drive power source 9 that generates the drive torque for the vehicle is transmitted to a left front wheel 3LF, a right front wheel 3RF, a left rear wheel 3LR, and a right rear wheel 3RR (referred to below as "wheels 3" when these may not be distinguished). The drive power source 9 may be an internal combustion engine of, for example, a gasoline engine or a diesel engine or a drive motor. The drive power source 9 may include the internal combustion engine and the drive motor.

Examples of the vehicle 1 may include an electric vehicle that includes two drive motors of a front wheel drive motor and a rear wheel drive motor and an electric vehicle that includes drive motors that are associated with the respective wheels 3. In the case where the vehicle 1 is an electric vehicle or a hybrid electric vehicle, the vehicle 1 can include a secondary battery that stores power to be supplied to a drive motor or a generator such as a motor or a fuel cell that generates power with which a battery is charged.

The vehicle 1 includes devices that are used for driving control for the vehicle 1 such as the drive power source 9, an electric steering device 15, and brake devices 17LF, 17RF, 17LR, and 17RR (referred to below as "brake devices 17" when these may not be distinguished). The drive power source 9 outputs drive torque that is transmitted to a front-wheel drive shaft 5F and a rear-wheel drive shaft 5R via a front-wheel differential mechanism 7F, a rear-wheel differential mechanism 7R, or a transmission not illustrated. A vehicle control apparatus 41 that includes one or more electronic control units (ECU) control the drive of the drive power source 9 and the transmission.

The electric steering device 15 is disposed on the front-wheel drive shaft 5F. The electric steering device 15 includes a gear mechanism and an electric motor not illustrated. The steering angles of the left front wheel 3LF and the right front wheel 3RF are adjusted under control of the vehicle control apparatus 41. During manual driving, the vehicle control apparatus 41 controls the electric steering device 15, based on the steering angle of a steering wheel 13 that is manipulated by a driver. During automatic driving, the vehicle control apparatus 41 controls the electric steering device 15, based on a travel track that is set.

The brake devices 17LF, 17RF, 17LR, and 17RR apply braking force to the left front, right front, left rear, and right rear wheels 3LF, 3RF, 3LR, and 3RR, respectively. The brake devices are, for example, hydraulic brake devices and produce predetermined braking force in a manner in which the vehicle control apparatus 41 controls hydraulic pressure that is applied to the brake devices 17. In the case where the vehicle 1 is an electric vehicle or a hybrid electric vehicle, the brake devices 17 are used together with regenerative braking with the drive motor.

The vehicle control apparatus 41 includes one or more electronic control devices that control the drive of the drive power source 9 that outputs the drive torque for the vehicle 1, the electric steering device 15 that controls the steering angle of the steering wheel, and the brake devices 17 that control the braking force for the vehicle 1. The vehicle control apparatus may have a function of controlling the drive of the transmission that adapts the output from the drive power source 9 and that transmits the resultant output to the wheels 3. The vehicle control apparatus 41 can obtain information that is transmitted from the driving assistance apparatus 50 and can implement automatic driving control for the vehicle 1.

The vehicle 1 includes front cameras 31LF and 31RF, a rear camera 31R, a vehicle state sensor 35, and a global positioning system (GPS) sensor 37.

The front cameras 31LF and 31RF and the rear camera 31R are included in a surrounding environment sensor that obtains information about the surrounding environment of the vehicle 1. The front cameras 31LF and 31RF and the rear camera 31R capture images of regions ahead of or behind the vehicle 1 and generate image data. The front cameras 31LF and 31RF and the rear camera 31R include imaging elements such as charged-coupled devices (CCDs) or complementary metal-oxide-semiconductor (CMOS) devices and transmit the generated image data to the driving assistance apparatus 50. As for the vehicle 1 illustrated in FIG. 1, the front cameras 31LF and 31RF function as a stereo camera that includes a pair of left and right cameras, and the rear camera 31R functions as a so-called monocular camera. However, each of these may be a stereo camera or a monocular camera.

For example, the vehicle 1 may include cameras that are disposed on side mirrors 11L and 11R and that capture images of left and right regions behind the vehicle 1 in addition to the front cameras 31LF and 31RF and the rear camera 31R. Other than these, the vehicle 1 may include one or more surrounding environment sensors that obtain information about the surrounding environment such as a light detection and ranging (LiDAR) sensor, a radar sensor such as a millimeter-wave radar sensor, and an ultrasonic sensor.

The vehicle state sensor 35 includes at least one sensor that detects the behavior and operational state of the vehicle 1. For example, the vehicle state sensor 35 includes at least one of a steering angle sensor, an accelerator position sensor, a brake stroke sensor, a brake pressure sensor, or an engine revolution sensor and detects the operational state of the vehicle 1 such as the steering angle of the steering wheel, an accelerator position, the amount of brake operation, or engine revolutions. For example, the vehicle state sensor 35 includes at least one of a vehicle speed sensor, an acceleration sensor, or an angular speed sensor and detects the behavior of the vehicle such as a vehicle speed, forward and backward acceleration, lateral acceleration, and a yaw rate. The vehicle state sensor 35 transmits a sensor signal that includes the detected information to the driving assistance apparatus 50.

The GPS sensor 37 receives a satellite signal from a GPS satellite. The GPS sensor 37 transmits information about the position of the vehicle 1 in map data that is included in the received satellite signal to the driving assistance apparatus 50. An antenna that receives a satellite signal from another satellite system that identifies the position of the vehicle 1 may be included instead of the GPS sensor 37.

2. Driving Assistance Apparatus

The driving assistance apparatus 50 according to the present embodiment will now be described as one example.

The driving assistance apparatus 50 according to the present embodiment sets the acceleration, deceleration, and travel track of the vehicle 1 by using the data of risk potential that is an indicator that represents a collision risk of the vehicle 1 with, for example, an obstacle around the vehicle 1 and transmits information about the driving conditions of the vehicle 1 to the vehicle control apparatus 41. In the following description, the vehicle 1 that includes the driving assistance apparatus 50 and that is assisted is referred to as the vehicle 1 in some cases.

2-1. Setting of Driving Conditions Based on Risk Potential

Figure 2:
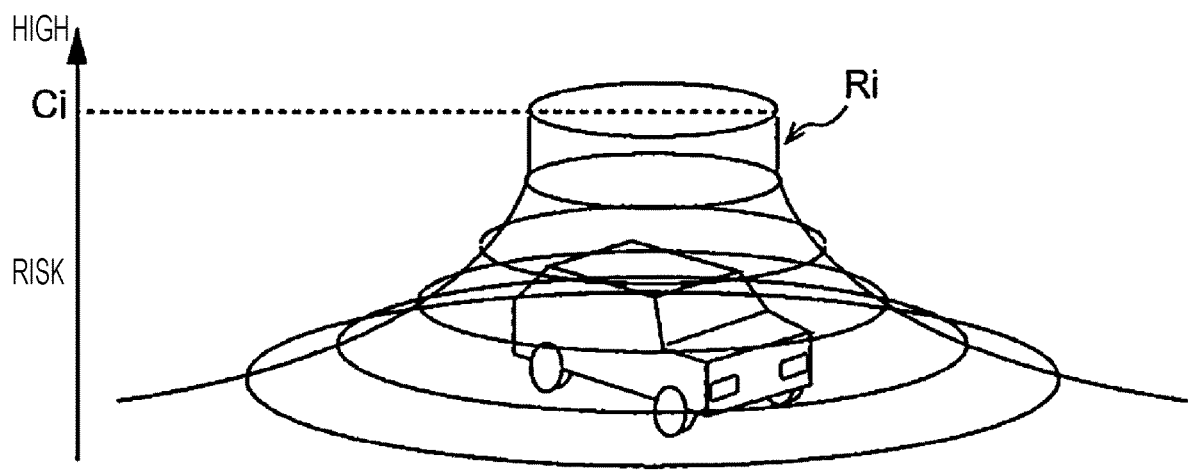
FIG. 2 illustrates risk potential of an object (a vehicle)

A method of setting the driving conditions of the vehicle 1 by using the data of the risk potential will now be briefly described. FIG. 2 illustrates the risk potential against an object. In an example illustrated in FIG. 2, the object is a vehicle. The value (the risk value) $R_i$ of the risk potential increases as the distance from the object (the vehicle) decreases. The risk value Ri can be expressed as an exponential function with respect to the distance xi from the object and is expressed, for example, as an expression (1) described below:

$$R_i = C_i \exp\left(-\frac{x_i - r_i}{\tau_i}\right) \quad (1)$$

where Ri is the risk value, Ci is a risk absolute value (a gain), xi is the distance from the object, τi is a gradient coefficient, ri is the radius of the object, and i is a number for distinguishing the object.

Figure 3:
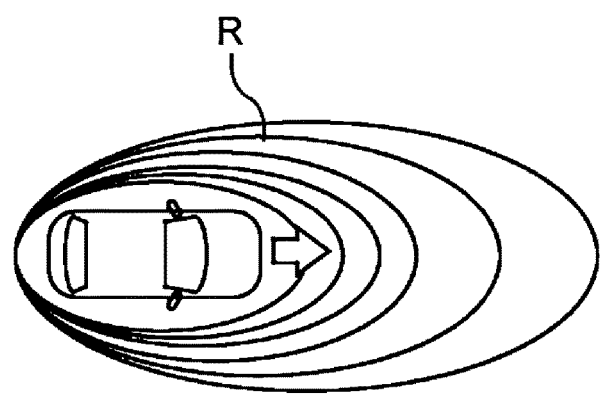
FIG. 3 illustrates an example of risk potential that is set for a vehicle that is traveling.

The risk absolute value Ci is the risk value when the distance xi from the object is zero, depends on the object, and is set for every object. For example, in the case where the object is a "vehicle" or a "short curb", the risk value Ri of a collision with the vehicle is larger than the risk value Ri of a collision with the short curb, and the risk absolute value Ci for the "vehicle" is set to a value larger than the risk absolute value Ci for the "short curb". The gradient coefficient τi is set to a value that is irrelevant to the object. While a surrounding vehicle is traveling, a risk in the movement direction of the vehicle increases. Accordingly, as illustrated in FIG. 3, the depth of the forward risk of the vehicle is more than that of the backward risk. The depth of the forward risk may be variable depending on the vehicle speed of the vehicle or a relative vehicle speed with respect to the vehicle.

In the case where the acceleration, deceleration, and travel track of the vehicle 1 are set by using the risk potential, the risks of a pedestrian, a surrounding vehicle, and an obstacle that are detected while the vehicle 1 is traveling are measured, the spatial overlap of the risk potential of each of these is added, and consequently, a risk map (a potential field) is obtained in consideration for the collision risk of obstacles. In the risk map, the degree of each risk is represented as a contour line on a two-dimensional plane. The risk value is two-dimensionally distributed as described above. The track can be selected such that the risk decreases. The risk map may be calculated in consideration for a risk (a latent risk) that is not manifest in addition to that of a manifest obstacle. For example, in the case where the vehicle 1 passes through a region in which there is a blind area ahead of a curve due to a shroud, a latent risk may be measured assuming that a passer or a vehicle emerges from the blind area and may be reflected on the risk map.

According to the present embodiment, the driving assistance apparatus 50 measures the risk of a trailing vehicle that travels behind the vehicle 1 in addition to the risk of a leading vehicle that travels ahead of the vehicle 1 and sets the driving conditions of the vehicle 1 in consideration for the backward risk of the vehicle 1 in addition to a risk in the movement direction of the vehicle 1.

2-2. Example of Structure of Driving Assistance Apparatus

Figure 4:
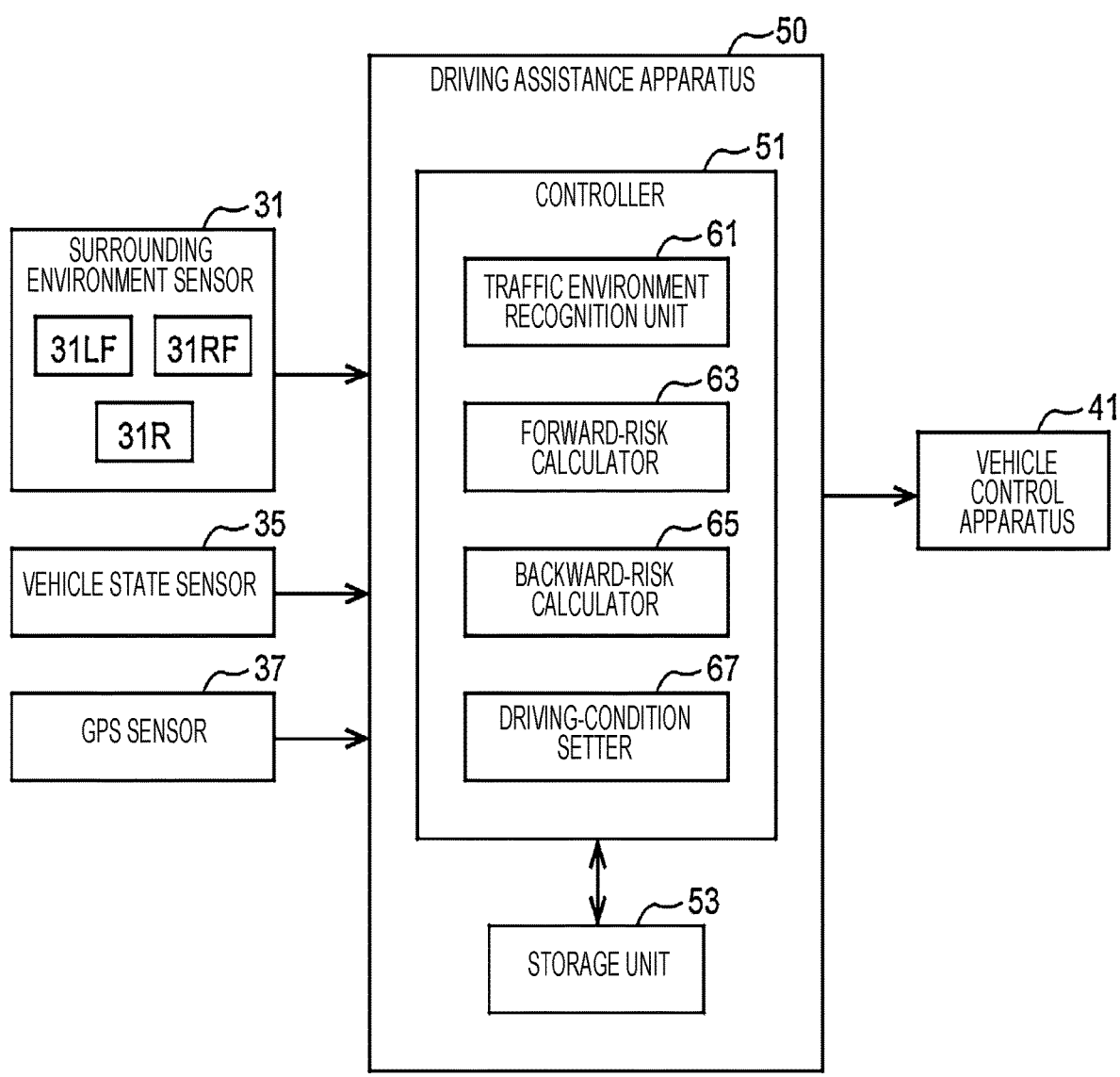
FIG. 4 is a block diagram illustrating an example of the structure of the driving assistance apparatus according to the embodiment.

FIG. 4 is a block diagram illustrating an example of the structure of the driving assistance apparatus 50 according to the embodiment.

A surrounding environment sensor 31, the vehicle state sensor 35, and the GPS sensor 37 are coupled to the driving assistance apparatus 50 directly or with a communication unit such as a controller area network (CAN) or a local interconnect network (LIN) interposed therebetween. In FIG. 4, the surrounding environment sensor 31 includes the front cameras 31LF and 31RF and the rear camera 31R and may additionally include a LiDAR sensor, a radar sensor, or an ultrasonic sensor. The vehicle control apparatus 41 is coupled to the driving assistance apparatus 50. The driving assistance apparatus 50 is not limited to an electronic control device that is included in the vehicle 1 but may be a terminal device such as a smartphone or a wearable device.

The driving assistance apparatus 50 includes a controller 51 and a storage unit 53. The storage unit 53 includes a storage element such as a random access memory (RAM) or a read only memory (ROM). The kind of the storage unit 53, however, is not particularly limited. The storage unit 53 stores a computer program that is run by the controller 51 and information such as various parameters that are used in an arithmetic operation, detection data, and the result of the arithmetic operation.

The controller 51 includes an arithmetic processing unit such as a central processing unit (CPU) and various peripheral components. A part or the whole of the controller 51 may be, for example, firmware, which can be updated, or a program module that is run by an instruction from, for example, the CPU. The controller 51 includes a traffic environment recognition unit 61, a forward-risk calculator 63, a backward-risk calculator 65, and a driving-condition setter 67. According to the present embodiment, the traffic environment recognition unit 61, the forward-risk calculator 63, the backward-risk calculator 65, and the driving-condition setter 67 are functional components that are achieved by a program that is run by the arithmetic processing unit.

2-2-1. Traffic Environment Recognition Unit

The traffic environment recognition unit 61 recognizes traffic environment around the vehicle 1, based on the detection data and the image data that are transmitted from the surrounding environment sensor 31. In one example, the traffic environment recognition unit 61 detects the leading vehicle that travels ahead of the vehicle 1, the trailing vehicle that travels behind the vehicle 1, a pedestrian, a bicycle, a travel lane (a lane line), and another obstacle by using a technique for detecting an object. The traffic environment recognition unit 61 calculates the positions of the leading vehicle, the trailing vehicle, and another object viewed from the vehicle 1, distances from the vehicle 1 to the leading vehicle, the trailing vehicle, and another object, and relative speeds of the leading vehicle, the trailing vehicle, and another object with respect to the vehicle 1. The traffic environment recognition unit 61 may recognize the traffic environment, based on information that is obtained by communication with the outside such as inter-vehicle communication.

2-2-2. Forward-Risk Calculator

The forward-risk calculator 63 calculates forward risk RF corresponding to the collision risk of the leading vehicle. According to the present embodiment, a region ahead of the vehicle 1 is set as a forward monitoring region MRf, and the forward risk RF is the maximum value of risk potential Rf of the leading vehicle that is located in the forward monitoring region MRf. In one example, the forward monitoring region MRf is set as a region for calculating the forward risk RF. How far the vehicle 1 moves per unit time differs depending on the vehicle speed of the vehicle 1. For this reason, the forward monitoring region MRf may be set so as to contain a farther position as the vehicle speed of the vehicle 1 increases.

In the case where the traffic environment recognition unit 61 detects the leading vehicle ahead of the vehicle 1, the forward-risk calculator 63 sets the risk potential Rf of the leading vehicle, based on the expression (1) described above.

At this time, if the leading vehicle is traveling, the risk potential Rf is set such that the range of the forward risk in the movement direction of the leading vehicle increases, and the depth increases. The depth of the forward risk of the leading vehicle may be variable depending on the vehicle speed of the leading vehicle. The forward-risk calculator 63 determines the forward risk RF to be the maximum value of the risk potential Rf in a region in which the set risk potential Rf of the leading vehicle and the forward monitoring region MRf overlap.

2-2-3. Backward-Risk Calculator

The backward-risk calculator 65 calculates the backward risk corresponding to the collision risk of the trailing vehicle. According to the present embodiment, a region behind the vehicle 1 is set as a backward monitoring region MRb, and backward risk RB is the maximum value of risk potential Rb of the trailing vehicle that is located in the backward monitoring region MRb. In one example, the backward monitoring region MRb is set as a region for calculating the backward risk RB.

In the case where the traffic environment recognition unit detects the trailing vehicle behind the vehicle 1, the backward-risk calculator 65 sets the risk potential Rb of the trailing vehicle, based on the expression (1) described above.

At this time, if the trailing vehicle is traveling, the risk potential Rb is set such that the range of the forward risk in the movement direction of the trailing vehicle increases, and the depth increases. The depth of the forward risk of the trailing vehicle may be variable depending on the vehicle speed of the trailing vehicle. The backward-risk calculator 65 determines the backward risk RB to be the maximum value of the risk potential Rb in a region in which the set risk potential Rb of the trailing vehicle and the backward monitoring region MRb overlap.

According to the present embodiment, the backward-risk calculator 65 may reflect the danger level of the trailing vehicle on the backward risk RB. Examples of dangerous situations of the trailing vehicle include the case where the driver of the trailing vehicle has poor driving skill, the case where the driver of the trailing vehicle drowsily drives, the case where the trailing vehicle travels excessively over the speed limit, and the case of so-called tailgating of the trailing vehicle.

The backward-risk calculator 65 can obtain information about the driving skill of the driver of the trailing vehicle from the trailing vehicle by using, for example, inter-vehicle communication or from, for example, a cloud server, based on data for identifying the driver of the trailing vehicle. The backward-risk calculator 65 can detect that the driver of the trailing vehicle drowsily drives, for example, based on the image data that is obtained from the rear camera 31R or by using the inter-vehicle communication. The backward-risk calculator 65 can detect that the trailing vehicle travels excessively over the speed limit or the tailgating of the trailing vehicle, based on the result of the arithmetic operation of the traffic environment recognition unit 61. However, the aspects of a state in which the trailing vehicle is dangerous and a detection method are not limited to examples described above.

Figure 5:
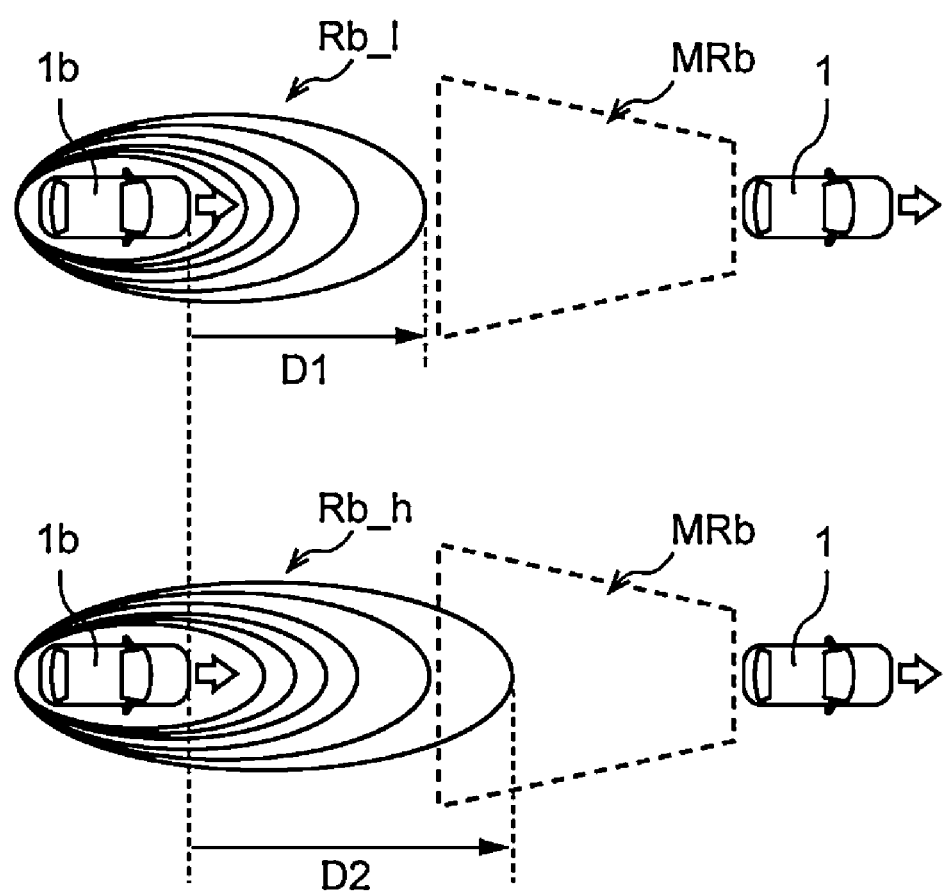
FIG. 5 illustrates examples of risk potential that depends on the danger level of a trailing vehicle.

FIG. 5 illustrates the risk potential Rb of the trailing vehicle by using a contour line on a two-dimensional plane. Risk potential Rb_l illustrated on the upper side of FIG. 5 is the risk potential when the danger level is relatively low. Risk potential Rb_h illustrated on the lower side of FIG. 5 is the risk potential when the danger level is relatively high. While a trailing vehicle 1b is traveling, a forward depth D2 of the risk potential Rb_h when the danger level is high is more than a forward depth D1 of the risk potential Rb_l when the danger level is low. The danger level of the trailing vehicle 1b is thus reflected on the risk potential Rb, and consequently, the backward risk RB in the backward monitoring region MRb of the vehicle 1 increases as the danger level of the trailing vehicle 1b increases. For this reason, the driving conditions can be set such that the risk of the trailing vehicle 1b such as a collision is effectively reduced.

2-2-4. Driving-Condition Setter

While the vehicle 1 is driven, the driving-condition setter 67 sets the driving conditions of the vehicle 1, based on the forward risk RF and the backward risk RB. In the case where there is the forward risk RF or the backward risk RB in the forward monitoring region MRf or the backward monitoring region MRb that is set as the region ahead of or behind the vehicle 1, the driving-condition setter 67 sets the driving conditions for avoiding or reducing the risk. The driving-condition setter 67 transmits information about the set driving conditions to the vehicle control apparatus 41. Consequently, the vehicle control apparatus 41 controls the acceleration and deceleration or the steering angle of the vehicle 1, and the risk is avoided or reduced.

According to the present embodiment, the driving-condition setter 67 sets the driving conditions for driving assistance in different ways between a state in which the vehicle 1 is decelerated and a state in which the vehicle 1 is accelerated. In one example, the driving-condition setter 67 sets a target deceleration (referred to below as a "forward-risk deceleration") for avoiding a collision of the vehicle 1 with a leading vehicle 1f, based on the forward risk RF and sets a target deceleration (referred to below as a "backward-risk deceleration") for reducing a risk of a collision with the trailing vehicle 1b, based on the backward risk RB. While the vehicle 1 is decelerated, the driving-condition setter 67 compares the forward-risk deceleration and the backward-risk deceleration and sets the driving conditions such that the vehicle 1 is more safely decelerated. While the vehicle 1 is accelerated, the driving-condition setter 67 sets the driving conditions, based on the forward-risk deceleration and the backward-risk deceleration such that the vehicle 1 is more safely accelerated or changes the lane.

The value of the forward-risk deceleration is a target value that is used to decelerate the vehicle 1 such that the forward risk RF decreases. For example, the forward-risk deceleration is set to a value that increases as the forward risk RF at the present time increases. That is, the forward-risk deceleration is set such that the vehicle 1 is more quickly decelerated as the forward risk RF increases. After the forward-risk deceleration is set, the timing Ts of a control instruction for deceleration at the forward-risk deceleration is set. The timing Ts of the control instruction represents a timing with which the vehicle control apparatus 41 is instructed to start control for deceleration when a collision time that is forecasted based on the relative speeds of the vehicle 1 and the leading vehicle 1f is defined as zero. The timing Ts of the control instruction is set so as to be advanced as the vehicle speed of the vehicle 1 and the relative speed of the vehicle 1 with respect to the leading vehicle 1f increase.

The value of the backward-risk deceleration is a target value that is used to reduce a risk of a collision with the trailing vehicle 1b and to decelerate the vehicle 1. For example, the backward-risk deceleration is set to a value that decreases as the backward risk RB increases. In this case, the backward-risk deceleration is set to a value that decreases as the backward risk increases.

Figure 6:
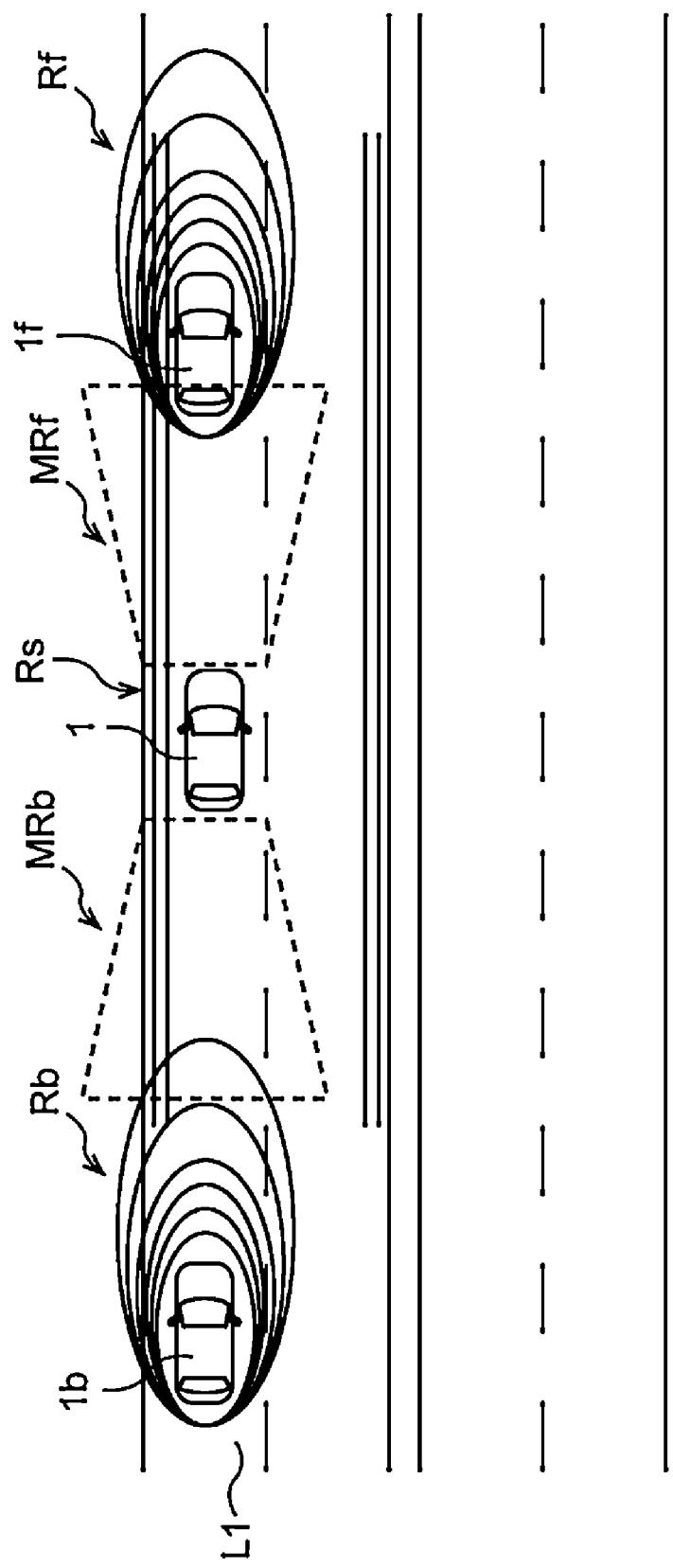
FIG. 6 illustrates a method of setting driving conditions with a vehicle being decelerated.

FIG. 6 is a schematic diagram for description of a method of setting the driving conditions with the vehicle 1 being decelerated. FIG. 6 illustrates the risk potential Rf of the leading vehicle 1f, the risk potential Rb of the trailing vehicle 1b, and risk potential Rs of a road shoulder or a side wall. A case that is thought here is that the leading vehicle 1f travels ahead of the vehicle 1 along a travel lane L1 and the trailing vehicle 1b travels behind the vehicle 1 along the travel lane L1. In the case where the vehicle 1 is decelerated to avoid a collision with the leading vehicle 1f in the circumstances, there is a possibility that the trailing vehicle 1b collides with the vehicle 1 depending on the deceleration or the timing Ts of the control instruction for deceleration.

For this reason, when the forward-risk deceleration is more than the backward-risk deceleration with the vehicle 1 being decelerated, the driving-condition setter 67 prioritizes a reduction in the risk of a collision with the trailing vehicle 1b and sets the target deceleration to the backward-risk deceleration. The set target deceleration is less than the forward-risk deceleration, and accordingly, the timing Ts of the control instruction for deceleration at the set target deceleration is advanced to reduce the risk of a collision with the leading vehicle 1f. This prevents the distance from the leading vehicle 1f from being too short and enables the risk of a collision with the trailing vehicle 1b to be reduced.

Alternatively, the forward-risk deceleration and the backward-risk deceleration may be weighted, and the target deceleration may be set such that the driver is inhibited from feeling uncomfortable as a result of the advance of the timing Ts of the control instruction for deceleration at the set target deceleration. For example, the target deceleration may be set based on a forward gaze ratio ($0 \leq \alpha < 1$) that is a ratio of a time during which the driver looks ahead of the vehicle 1 in the movement direction of the vehicle 1 and may be expressed as an expression (2) described below:

$$\text{target deceleration} = \text{forward-risk deceleration} \times \alpha + \text{backward-risk deceleration} \times (1-\alpha) \qquad (2)$$

It is thought that when the forward gaze ratio $\alpha$ is high, the sensitivity of the driver toward the forward risk is high. Accordingly, the target deceleration is set by using the expression (2) described above, and consequently, the target deceleration can be set such that the sensitivity toward the risk is reflected thereon.

The forward gaze ratio can be obtained by detecting the gaze of the driver, based on image data that is obtained by, for example, an interior camera and calculating the ratio of the time during which the driver looks ahead to a predetermined time. The forward gaze ratio ($0 \leq \alpha < 1$) may be set based on frequency at which the gaze of the driver is averted from the region located ahead in the movement direction.

When the forward-risk deceleration is less than the backward-risk deceleration with the vehicle 1 being decelerated, the driving-condition setter 67 sets the target deceleration to the forward-risk deceleration. In this case, the set target deceleration is less than the backward-risk deceleration, the risk of a collision with the trailing vehicle 1b is very low, and accordingly, the risk of a collision with the leading vehicle 1f can be safely reduced.

In the case where the vehicle 1 is controlled so as to be decelerated based on the forward risk RF and the backward risk RB, the driving-condition setter 67 may correct the target deceleration or the timing Ts of the control instruction for deceleration depending on the backward risk RB. For example, when the backward risk RB is high, the risk of a collision with the trailing vehicle 1b increases due to sudden deceleration. When the backward risk RB is high, the timing Ts of the control instruction for deceleration is slow, and consequently, the risk of a collision with the trailing vehicle 1b increases.

Accordingly, the driving-condition setter 67 may makes a correction such that as the backward risk RB increases, the target deceleration decreases or the timing Ts of the control instruction for deceleration is more advanced.

Figure 7:
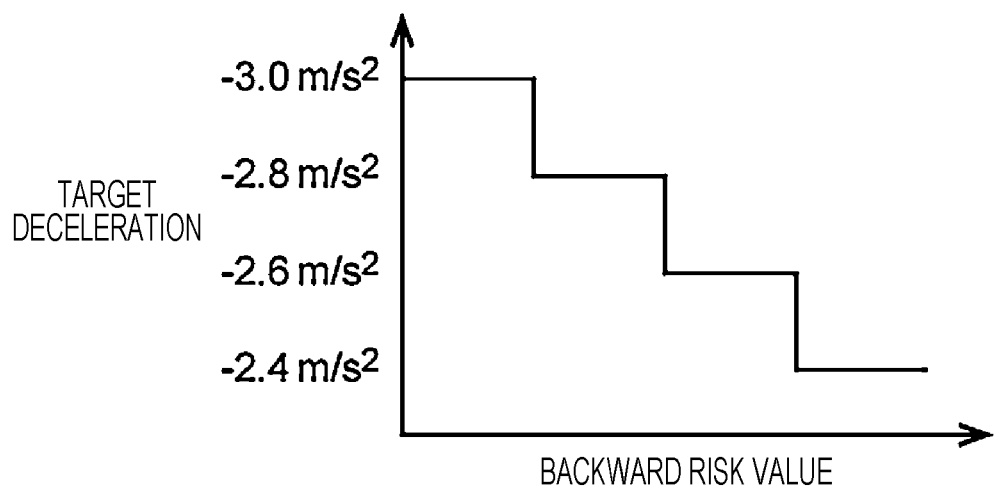
FIG. 7 illustrates a target deceleration that is set depending on a backward risk.
Figure 8:
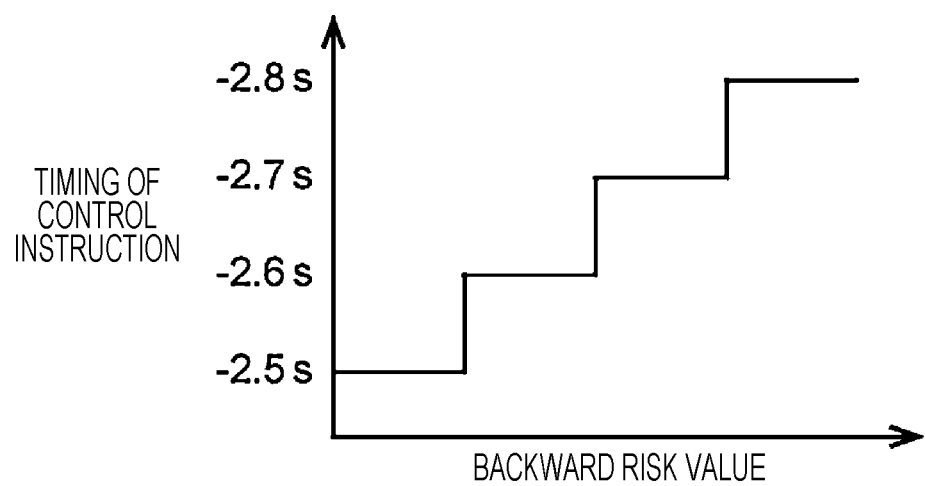
FIG. 8 illustrates a timing of a control instruction for deceleration that is set depending on the backward risk.

FIG. 7 and FIG. 8 illustrate the target deceleration or the timing Ts of the control instruction, respectively, that is set depending on the backward risk RB. The vertical axis in FIG. 8 represents the timing Ts of the control instruction when the collision time that is forecasted based on the relative speeds of the vehicle 1 and the leading vehicle 1f is defined as zero.

As illustrated in FIG. 7, as the backward risk RB increases, the set target deceleration decreases.

In an example illustrated in FIG. 7, as the backward risk RB increases, the target deceleration decreases stepwise but may linearly decrease. As illustrated in FIG. 8, as the backward risk RB increases, the timing Ts of the control instruction for deceleration is more advanced. As the backward risk RB increases, the timing Ts of the control instruction for deceleration may linearly decrease similarly.

The driving-condition setter 67 thus makes the correction such that as the backward risk RB increases, the target deceleration decreases or the timing Ts of the control instruction for deceleration is more advanced, and consequently, the risk of a collision with the trailing vehicle 1b can be reduced depending on the traffic environment at this time.

Figure 9:
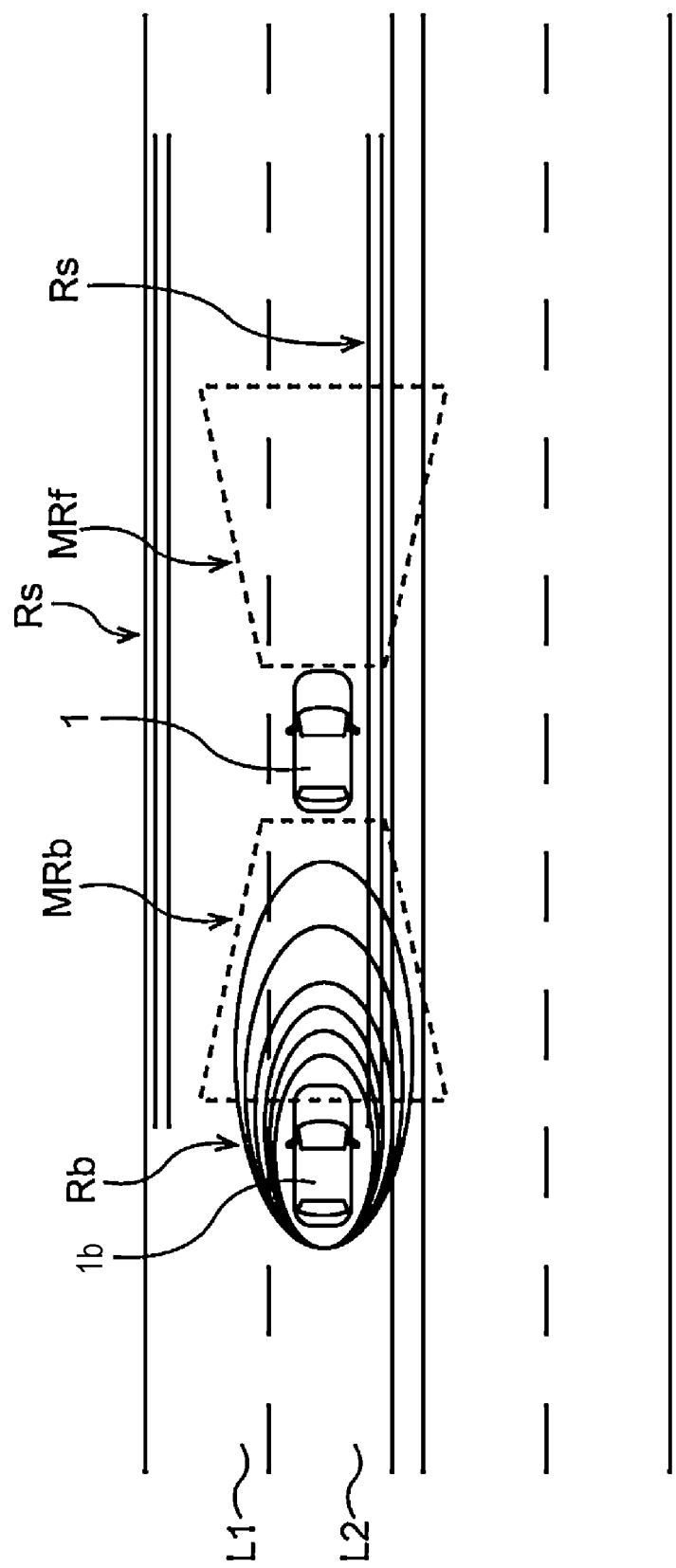
FIG. 9 illustrates a method of setting the driving conditions with the vehicle being accelerated or being traveling at a constant speed.

FIG. 9 is a schematic diagram for description of a method of setting the driving conditions with the vehicle 1 being accelerated or traveling at a constant speed. FIG. 9 illustrates the risk potential Rb of the trailing vehicle 1b and the risk potential Rs of a road shoulder or a side wall. A case that is thought here is that no leading vehicle travels ahead of the vehicle 1 along a travel lane L2, and the trailing vehicle 1b travels behind the vehicle 1 along the travel lane L2. In the case where the trailing vehicle 1b approaches the vehicle 1 in the circumstances, there is a possibility that the trailing vehicle 1b collides with the vehicle 1, or the tailgating of the trailing vehicle 1b is induced.

For this reason, in the case where the forward-risk deceleration is zero or less, that is, the vehicle 1 may not be decelerated, and the backward-risk deceleration is more than zero with the vehicle 1 being accelerated or traveling at a constant speed, the driving-condition setter 67 causes the vehicle 1 to accelerate or change the lane such that the distance from the trailing vehicle 1b is ensured and the backward risk RB is reduced. In this case, the target deceleration (the target acceleration) is set to be equal to or less than the predetermined upper limit of the acceleration, based on the value of the backward risk RB and the relative vehicle speed of the trailing vehicle 1b with respect to the vehicle 1.

However, even when the vehicle 1 is accelerated, for example, in the case where the trailing vehicle 1b approaches the vehicle 1, there is possibility that the backward risk RB cannot be reduced. In particular, in the case where the so-called tailgating of the trailing vehicle 1b occurs, there is a possibility that the trailing vehicle 1b follows the vehicle 1 at a short distance unless the vehicle 1 changes the lane. In this case, when the lane is changeable into, for example, the adjacent travel lane L1, a change in the lane may be prioritized. For example, whether the lane is changeable into the adjacent travel lane L1 may be determined by whether the adjacent travel lane L1 has a region to which the vehicle 1 can move with the risk potential being equal to or less than a predetermined value.

3. Example of Operation of Driving Assistance Apparatus

Figure 10:
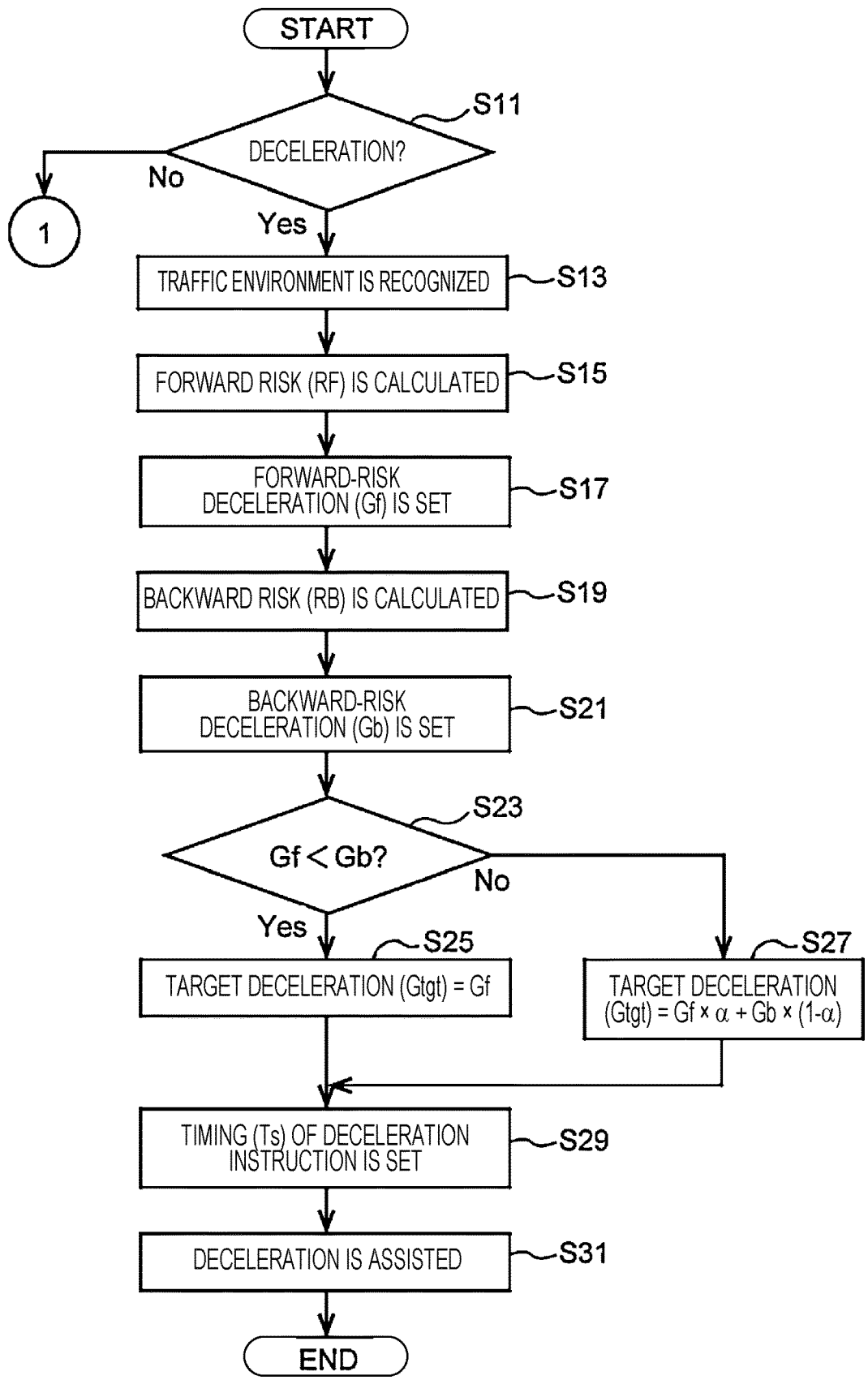
FIG. 10 is a flowchart illustrating an example of assistance processing of the driving assistance apparatus according to the embodiment.
Figure 11:
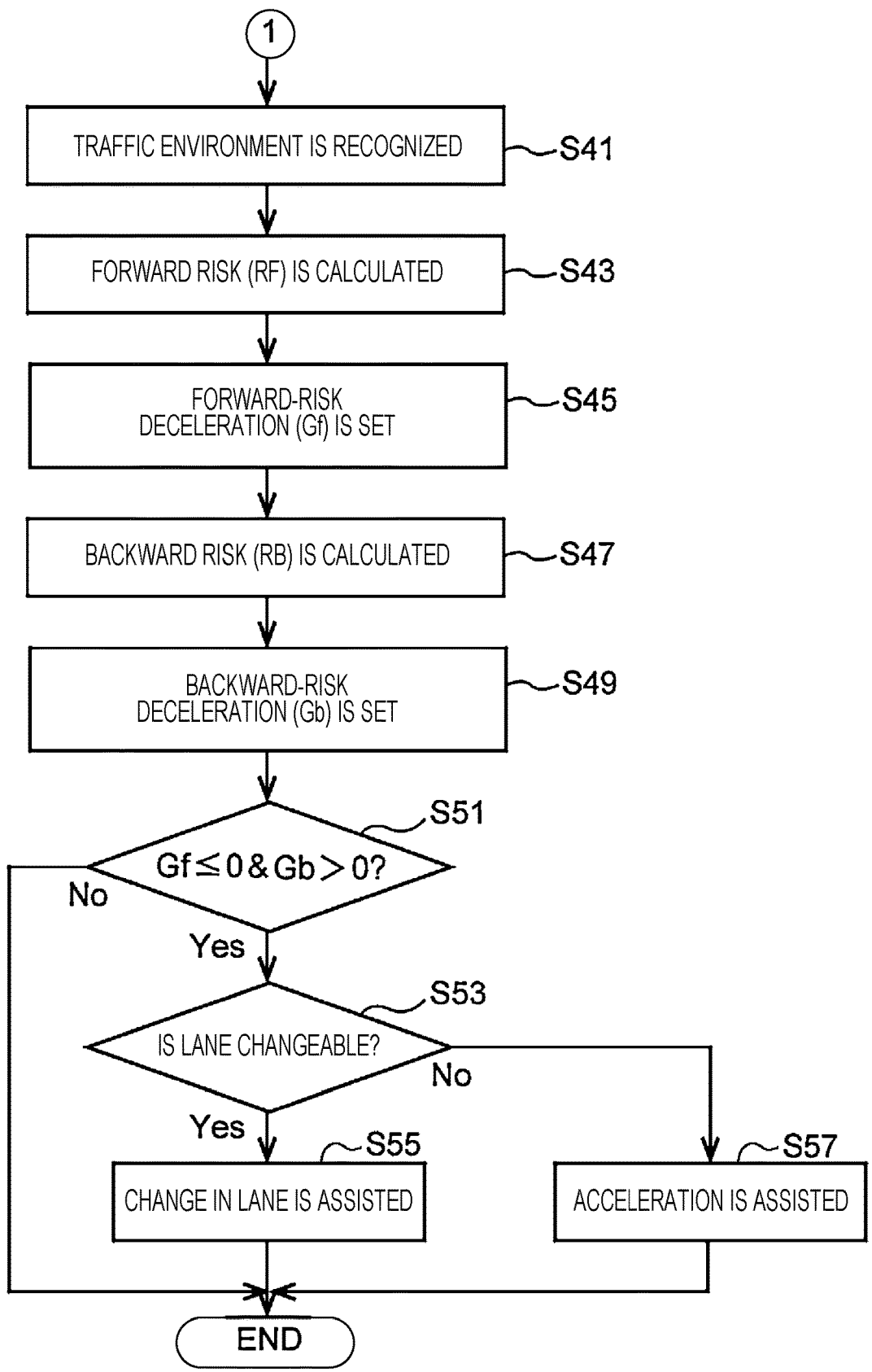
FIG. 11 is a flowchart illustrating an example of the assistance processing of the driving assistance apparatus according to the embodiment.

An example of the operation of the driving assistance apparatus 50 according to the present embodiment will now be described by using flowcharts. FIG. 10 and FIG. 11 are flowcharts illustrating an example of the processing of driving assistance that is performed by the driving assistance apparatus 50.

The driving-condition setter 67 of the driving assistance apparatus 50 first determines whether the vehicle 1 is being decelerated (a step S11). For example, the driving-condition setter 67 determines whether the vehicle 1 is being decelerated, based on a change in the vehicle speed that is detected by the vehicle speed sensor. The driving-condition setter 67 may determine whether the vehicle 1 is being decelerated, based on a message that is obtained from another control apparatus such as the vehicle control apparatus 41. If the vehicle 1 is not being decelerated (No at S11), that is, if the vehicle 1 is being accelerated or is traveling at a constant speed, the processing proceeds to a step S41 in the flowchart in FIG. 11.

If the vehicle 1 is being decelerated (Yes at S11), the traffic environment recognition unit 61 of the driving assistance apparatus 50 recognizes the traffic environment around the vehicle 1, based on the detection data and the image data that are transmitted from the surrounding environment sensor 31 (a step S13). In one example, the traffic environment recognition unit 61 detects, for example, the leading vehicle 1*f*, the trailing vehicle 1*b*, a pedestrian, a bicycle, a travel lane (a lane line), and another obstacle and calculates the positions of, for example, the leading vehicle 1*f* and the trailing vehicle 1*b* viewed from the vehicle 1, the distances from the vehicle 1 to, for example, the leading vehicle 1*f* and the trailing vehicle 1*b*, and the relative speeds of, for example, the leading vehicle 1*f* and the trailing vehicle 1*b* with respect to the vehicle 1. The traffic environment recognition unit 61 may recognize the traffic environment, based on information that is obtained by communication with the outside such as the inter-vehicle communication.

Subsequently, the forward-risk calculator 63 of the driving assistance apparatus 50 calculates the forward risk RF (a step S15). In one example, in the case where the traffic environment recognition unit 61 detects the leading vehicle 1*f*, the forward-risk calculator 63 sets the risk potential Rf of the leading vehicle 1*f*, based on the expression (1) described above. At this time, in the case where the leading vehicle 1*f* is traveling, the risk potential Rf is set such that the range of the forward risk in the movement direction of the leading vehicle 1*f* increases, and the depth increases. The forward-risk calculator 63 determines the forward risk RF to be the maximum value of the risk potential Rf in a region in which the forward monitoring region MRf that is set ahead of the vehicle 1 and the set risk potential Rf of the leading vehicle 1*f* overlap.

Subsequently, the driving-condition setter 67 sets forward-risk deceleration Gf for avoiding a collision of the vehicle 1 with the leading vehicle 1*f*, based on the forward risk RF that is set by the forward-risk calculator 63 (a step S17). For example, the driving-condition setter 67 sets the forward-risk deceleration Gf such that the forward-risk deceleration Gf increases as the forward risk RF at the present time increases.

Subsequently, the backward-risk calculator 65 of the driving assistance apparatus 50 calculates the backward risk RB (a step S19). In one example, in the case where the traffic environment recognition unit 61 detects the trailing vehicle 1*b*, the backward-risk calculator 65 sets the risk potential Rb of the trailing vehicle 1*b*, based on the expression (1) described above. At this time, in the case where the trailing vehicle 1*b* is traveling, the risk potential Rb is set such that the range of the forward risk in the movement direction of the trailing vehicle 1*b* increases, and the depth increases. The backward-risk calculator 65 determines the backward risk RB to be the maximum value of the risk potential Rb in a region in which the backward monitoring region MRb that is set behind the vehicle 1 and the set risk potential Rb of the trailing vehicle 1*b* overlap.

According to the present embodiment, the backward-risk calculator 65 reflects the danger level of the trailing vehicle 1*b* on the backward risk RB (see FIG. 5). In one example, the backward-risk calculator 65 may obtain the information about the driving skill of the driver of the trailing vehicle and may correct the risk potential Rb such that the depth D2 of the risk potential Rb ahead of the trailing vehicle 1*b* in the movement direction increases in the case where the driving skill is poor. In the case where it is detected that the driver of the trailing vehicle drowsily drives, that the trailing vehicle travels over the speed limit, that the tailgating of the trailing vehicle occurs, or the like, the backward-risk calculator 65 may correct the risk potential Rb such that the depth D2 of the risk potential Rb ahead of the trailing vehicle 1*b* in the movement direction increases.

Subsequently, the driving-condition setter 67 sets backward-risk deceleration Gb for reducing the risk of a collision of the trailing vehicle 1*b*, based on the backward risk RB that is set by the backward-risk calculator 65 (a step S21). For example, the driving-condition setter 67 sets the backward-risk deceleration Gb depending on the backward risk RB. In this case, the backward-risk deceleration is set to a value that decreases as the backward risk RB increases.

Subsequently, the driving-condition setter 67 compares the forward-risk deceleration Gf and the backward-risk deceleration Gb and determines whether the forward-risk deceleration Gf is less than the backward-risk deceleration Gb (a step S23). If the forward-risk deceleration Gf is less than the backward-risk deceleration Gb (Yes at S23), the driving-condition setter 67 sets target deceleration Gtgt to the forward-risk deceleration Gf (a step S25).

If the forward-risk deceleration Gf is not less than the backward-risk deceleration Gb (No at S23), that is, if the forward-risk deceleration Gf is equal to or more than the backward-risk deceleration Gb, the driving-condition setter 67 sets the target deceleration Gtgt, based on the forward-risk deceleration Gf and the backward-risk deceleration Gb (a step S27). In one example, the driving-condition setter 67 detects the gaze of the driver, based on the image data that is obtained by the interior camera and obtains the forward gaze ratio $\alpha$ by calculating the ratio of the time during which the driver looks ahead to a predetermined time. The forward gaze ratio ($0 \leq \alpha < 1$) may be set based on the frequency at which the gaze of the driver is averted from the region located ahead in the movement direction. The driving-condition setter 67 sets the target deceleration Gtgt by using the forward gaze ratio $\alpha$, the forward-risk deceleration Gf, and the backward-risk deceleration Gb, based on the expression (2) described above.

The driving-condition setter 67 may correct, depending on the backward risk RB, the target deceleration Gtgt that is set at the step S25 or the step S27. For example, the driving-condition setter 67 corrects the target deceleration Gtgt such that the target deceleration Gtgt decreases as the backward risk RB increases. Consequently, as the backward risk RB increases, more sudden deceleration is avoided, and the risk of a collision with the trailing vehicle 1*b* can be further reduced.

After the target deceleration Gtgt is set at the step S25 or the step S27, the driving-condition setter 67 sets the timing Ts of the control instruction with which an instruction for controlling the deceleration at the set target deceleration Gtgt is transmitted to the vehicle control apparatus 41 (a step S29). In one example, the driving-condition setter 67 sets the timing Ts of the control instruction, based on the relative speed of the vehicle 1 with respect to the leading vehicle if such that the timing is more advanced as the relative speed increases. The driving-condition setter 67 may correct the timing Ts of the control instruction depending on the backward risk RB. For example, the driving-condition setter 67 corrects the timing Ts of the control instruction such that the timing Ts of the control instruction is more advanced as the backward risk RB increases. Consequently, the deceleration starts with a timing that is more advanced as the backward risk RB increases, the deceleration can be gentler, and accordingly, the risk of a collision with the trailing vehicle 1b can be further reduced.

After the target deceleration Gtgt and the timing Ts of the control instruction for deceleration are set, the driving-condition setter 67 assists deceleration with the set timing Ts of the control instruction for deceleration (a step S31). In one example, the driving-condition setter 67 transmits information about the target deceleration Gtgt and the instruction for deceleration to the vehicle control apparatus 41 with the timing Ts of the control instruction for deceleration. The vehicle control apparatus 41 causes the vehicle 1 to decelerate at the set target deceleration Gtgt while reducing the risk of a collision with the trailing vehicle 1b. This enables the vehicle 1 to avoid a collision with the leading vehicle 1f.

If it is determined that the vehicle 1 is not being decelerated at the step S11 described above (No at S11), the traffic environment recognition unit 61, the forward-risk calculator 63, the backward-risk calculator 65, and the driving-condition setter 67 recognize the traffic environment around the vehicle 1, calculate the forward risk RF and the backward risk RB, and calculate the forward-risk deceleration Gf and the backward-risk deceleration Gb as in the step S13 to the step S21 (the step S41 to a step S49).

Subsequently, the driving-condition setter 67 compares the forward-risk deceleration Gf and the backward-risk deceleration Gb and determines whether the forward-risk deceleration Gf is zero or less and the backward-risk deceleration Gb is more than zero (a step S51). At the step S51, whether the vehicle 1 may not be decelerated and whether the trailing vehicle 1b approaches the vehicle 1 are determined.

If the forward-risk deceleration Gf is not zero or less, or the backward-risk deceleration Gb is zero or less (No at S51), the vehicle 1 is to be decelerated or the trailing vehicle 1b does not approach the vehicle 1, and accordingly, the processing returns to the start in FIG. 10 without the driving assistance. If the forward-risk deceleration Gf is zero or less and the backward-risk deceleration Gb is more than zero (Yes at S51), the driving-condition setter 67 determines whether the lane of the vehicle 1 is changeable (a step S53). For example, the driving-condition setter 67 may determine whether the lane of the vehicle 1 is changeable by whether the adjacent travel lane has a region to which the vehicle 1 can move with the risk potential being equal to or less than a predetermined value.

If the lane of the vehicle 1 is changeable (Yes at S53), the driving-condition setter 67 assists in changing the lane (a step S55). In one example, the driving-condition setter 67 sets the travel track such that the vehicle 1 moves to the region of the adjacent travel lane to which the vehicle 1 can move and transmits information about the forward-risk deceleration Gf, information about a target travel track, and an instruction for changing the lane to the vehicle control apparatus 41. In this case, the forward-risk deceleration Gf is zero or a negative value, that is, an instruction for maintaining the vehicle speed at the present time or an instruction for acceleration. The vehicle control apparatus 41 adjusts the vehicle speed depending on the forward-risk deceleration Gf, controls the operation of the electric steering device 15 so as to follow the set target travel track, and changes the lane of the vehicle 1. This enables the trailing vehicle 1b to prioritize overtaking the vehicle 1 and enables the risk of a collision with the trailing vehicle 1b to be reduced.

If the lane of the vehicle 1 is not changeable (No at S53), the driving-condition setter 67 assists acceleration (a step S57). In one example, the driving-condition setter 67 transmits the information about the target deceleration Gtgt and an instruction for acceleration to the vehicle control apparatus 41. In this case, the target deceleration (the target acceleration) Gtgt is set to a value equal to or less than the predetermined upper limit of the acceleration, based on the value of the backward risk RB and the relative vehicle speed of the trailing vehicle 1b with respect to the vehicle 1. The vehicle control apparatus 41 adjusts the vehicle speed at the target deceleration (the target acceleration) Gtgt. Consequently, the distance from the trailing vehicle 1b is maintained or increased, and the risk of a collision with the trailing vehicle 1b can be reduced.

4. Effects of Driving Assistance Apparatus According to Present Embodiment

The driving assistance apparatus 50 according to the present embodiment sets the driving conditions of the vehicle 1, based on the backward risk RB of the vehicle 1 in addition to the forward risk RF as described above. Accordingly, when control for avoiding a collision with the leading vehicle if is implemented, the possibility of a collision with the trailing vehicle 1b can be reduced. In particular, the driving assistance apparatus 50 according to the present embodiment changes the content of the driving assistance depending on whether the vehicle 1 is being decelerated, accelerated, or is traveling at a constant speed. For this reason, the risk of a collision with the trailing vehicle 1b can be appropriately reduced depending on the traffic environment around the vehicle 1.

If the vehicle 1 is being decelerated, the driving assistance apparatus 50 according to the present embodiment changes the driving conditions of the vehicle 1 depending on which of the forward-risk deceleration Gf that is set based on the forward risk RF and the backward-risk deceleration Gb that is set based on the backward risk RB is higher. When the backward-risk deceleration Gb is less than the forward-risk deceleration Gf, the driving assistance apparatus 50 advances the timing Ts of the control instruction for deceleration from that when the forward-risk deceleration Gf is less than backward-risk deceleration Gb. This enables the distance from the leading vehicle if to be inhibited from decreasing even when the vehicle 1 is decelerated at the target deceleration Gtgt less than the forward-risk deceleration Gf to reduce the risk of a collision with the trailing vehicle 1b.

When the backward-risk deceleration Gb is less than the forward-risk deceleration Gf, the driving assistance apparatus 50 according to the present embodiment weights the forward-risk deceleration Gf and the backward-risk deceleration Gb, based on the forward gaze ratio $\alpha$ of an occupant of the vehicle 1 and sets the target deceleration Gtgt.

Consequently, deceleration can be assisted with the sensitivity toward the risk of a region ahead of the driver reflected, and fear or an uncomfortable feeling of the driver due to the driving assistance can be reduced.

If the vehicle 1 is being decelerated, the driving assistance apparatus 50 according to the present embodiment sets the driving conditions of the vehicle 1, based on the forward-risk deceleration Gf when the forward-risk deceleration Gf is less than the backward-risk deceleration Gb. Consequently, the risk of a collision with the trailing vehicle 1b does not increase, the vehicle 1 is not excessively decelerated, and a collision with the leading vehicle if can be avoided.

If the vehicle 1 is being accelerated or is traveling at a constant speed, the driving assistance apparatus 50 according to the present embodiment prioritizes assistance in changing the lane and transmits the control instruction to the vehicle control apparatus 41 when the lane of the vehicle 1 is changeable. The driving assistance apparatus 50 according to the present embodiment transmits the information about the target deceleration Gtgt and the instruction for acceleration to the vehicle control apparatus 41 when the lane is unchangeable, and the forward risk RF is zero or less. Consequently, the distance from the trailing vehicle 1b is maintained or increased, and the risk of a collision with the trailing vehicle 1b can be reduced.

A preferred embodiment of the disclosure is described above in detail with reference to the drawings. The embodiment of the disclosure, however, is not limited thereto. It is clear for a person skilled in the art to conceive various modifications and alterations within the range of technical ideas recited in claims, and these are naturally included in the technical range of the embodiment of the disclosure.

The embodiment of the disclosure described above can assist in driving the vehicle in consideration for the backward risk of the vehicle in addition to the forward risk.

The controller 51 illustrated in FIG. 4 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 51 including the traffic environment recognition unit 61, the forward-risk calculator 63, the backward-risk calculator 65, and the driving-condition setter 67. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 4.

The invention claimed is:

1. A driving assistance apparatus for a vehicle, the driving assistance apparatus comprising:
    a forward-risk calculator configured to calculate a forward risk corresponding to a risk of a collision with a leading vehicle that travels ahead of the vehicle;
    a backward-risk calculator configured to calculate a backward risk corresponding to a risk of a collision with a trailing vehicle that travels behind the vehicle;
    a driving-condition setter configured to set a deceleration target of the vehicle while the vehicle is being decelerated, and set an acceleration target of the vehicle while the vehicle is being accelerated or is traveling at a constant speed, the deceleration target and the acceleration target being different from each other; and
    an electronic control unit configured to control a speed of the vehicle in accordance with the deceleration target or the acceleration target, wherein
    the driving-condition setter is configured to, in response to determining that the vehicle is being decelerated:
        set, based only on the forward risk from the forward risk and the backward risk, a first deceleration target to be greater as the forward risk increases for avoiding the forward risk;
        set, based only on the backward risk from the forward risk and the backward risk, a second deceleration target to be smaller as the backward risk increases for avoiding the backward risk;
        set, in response to the first deceleration target being less than the second deceleration target, the first deceleration target for the deceleration target;
        set, in response to the second deceleration target being less than the first deceleration target, a value smaller than the first deceleration target for the deceleration target; and
        set, in response to the vehicle being accelerated or being traveling at the constant speed, the acceleration target such that the forward risk does not increase and the backward risk decreases.

2. The driving assistance apparatus according to claim 1, wherein in a case where the vehicle can make a lane change from a current traveling lane to a lane adjacent to the current travel lane, the driving-condition setter is configured to prioritize the lane change.

3. The driving assistance apparatus according to claim 1, wherein the driving-condition setter is configured to set the value smaller than the first deceleration target based on:
    detecting a gaze of a driver of the vehicle based on image data that is obtained by an interior camera of the vehicle;
    calculating a ratio of a time during which the driver looks ahead to a predetermined time; and
    setting the value smaller than the first deceleration target based on the first deceleration target, the second deceleration target, and the ratio of the time during which the driver looks ahead.

4. The driving assistance apparatus according to claim 1, wherein a current speed of the vehicle is maintained when the deceleration target is set to zero, the current speed of the vehicle is accelerated when the deceleration target is set to a negative value, and the current vehicle speed is decelerated when the deceleration target is set to a positive value.

5. A driving assistance apparatus for a vehicle, the driving assistance apparatus comprising circuitry configured to:
    calculate a forward risk corresponding to a risk of a collision with a leading vehicle that travels ahead of the vehicle;
    calculate a backward risk corresponding to a risk of a collision with a trailing vehicle that travels behind the vehicle;
    set a deceleration target of the vehicle while the vehicle is being decelerated, and set an acceleration target of the vehicle while the vehicle is being accelerated or is traveling at a constant speed, the deceleration target and the acceleration target being different from each other;

control a speed of the vehicle in accordance with the deceleration target or the acceleration target;

set, based only on the forward risk from the forward risk and the backward risk, a first deceleration target to be greater as the forward risk increases for avoiding the forward risk;

set, based only on the backward risk from the forward risk and the backward risk, a second deceleration target to be smaller as the backward risk increases for avoiding the backward risk;

set, in response to the first deceleration target being less than the second deceleration target, the first deceleration target for the deceleration target;

set, in response to the second deceleration target being less than the first deceleration target, a value smaller than the first deceleration target for the deceleration target; and set, in response to the vehicle being accelerated or being traveling at the constant speed, the acceleration target such that the forward risk does not increase and the backward risk decreases.

6. The driving assistance apparatus according to claim 5, wherein the circuitry is configured to set the value smaller than the first deceleration target based on:

detecting a gaze of a driver of the vehicle based on image data that is obtained by an interior camera of the vehicle;

calculating a ratio of a time during which the driver looks ahead to a predetermined time; and setting the value smaller than the first deceleration target based on the first deceleration target, the second deceleration target, and the ratio of the time during which the driver looks ahead.

7. The driving assistance apparatus according to claim 5, wherein a current speed of the vehicle is maintained when the deceleration target is set to zero, the current speed of the vehicle is accelerated when the deceleration target is set to a negative value, and the current vehicle speed is decelerated when the deceleration target is set to a positive value.

* * * * *